US008732614B2

(12) United States Patent  (10) Patent No.: US 8,732,614 B2
Blain et al.  (45) Date of Patent: May 20, 2014

(54) TOOLBAR DOCUMENT CONTENT SHARING

(75) Inventors: Matthew Blain, Sunnyvale, CA (US); Alex Mendes da Costa, San Francisco, CA (US); Na Tang, Davis, CA (US)

(73) Assignee: Google Inc., Mountain View, CA (US)

( * ) Notice: Subject to any disclaimer, the term of this patent is extended or adjusted under 35 U.S.C. 154(b) by 82 days.

(21) Appl. No.: 11/321,077

(22) Filed: Dec. 30, 2005

(65) Prior Publication Data

US 2007/0157104 A1  Jul. 5, 2007

(51) Int. Cl.
*G06F 3/048* (2013.01)
(52) U.S. Cl.
USPC ........... 715/835; 715/724; 715/748; 715/751; 715/752; 715/779
(58) Field of Classification Search
USPC ......................................................... 715/835
See application file for complete search history.

(56) References Cited

U.S. PATENT DOCUMENTS

| | | | | |
|---|---|---|---|---|
| 5,550,969 | A * | 8/1996 | Torres et al. | 715/787 |
| 7,278,092 | B2 * | 10/2007 | Krzanowski | 715/205 |
| 7,802,207 | B2 * | 9/2010 | Agboatwalla et al. | 715/866 |
| 8,020,101 | B2 * | 9/2011 | Kesavarapu | 715/724 |
| 2005/0039141 | A1 * | 2/2005 | Burke et al. | 715/810 |
| 2006/0010394 | A1 * | 1/2006 | Chaudhri et al. | 715/779 |
| 2006/0010395 | A1 * | 1/2006 | Aaltonen | 715/779 |
| 2007/0192725 | A1 * | 8/2007 | Chen et al. | 715/779 |

OTHER PUBLICATIONS

Microsoft Word 2000 , see attached document.*
• Bill Camarda; Special Edition Using® Microsoft® Office Word 2003; Dec. 12, 2003; Que; ISBN-10:0-7897-2958-3; Pages in print edition 1272.*
"Yahoo! Toolbar—Anti-Spy"; http://messages.toolbar.yahoo.com/toolbar/threadview?m=tm&bn=TOO-YTIE&tid=582&mid=582&tof=-1&rt=2&frt=2&off=1, Jun. 19, 2008, 1 page.
"Sharing Information Using Yahoo! Smart Tools"; http://help.yahoo.com/l/us/yahoo/toolbar/features/smarttools/smarttools-08.html, Jun. 19, 2008, 1 page.
"Yahoo Launches My Web Personal Search"; http://searchenginewatch.com/showPage.html?page=3500716, Jun. 19, 2008, 1 page.
"Sharing Information Using Yahoo! Smart Tools" http://usatoday.com/tech/news/techpolicy/2005-06-22-file-sharing x.htm, Jun. 19, 2008, 1 page.
"Saving, Sharing, and Syndicating Search via My Web"; http://www.ysearchblog.com/archives/000104.html, Jun. 19, 2008, 8 pages.
"My Web 2.0 BETA"; http://myweb.search.yahoo.com/myresults/faq, Jun. 19, 2008, 11 pages.
"Seizing on Copyright-Friendly, file-swapping alternatives" http://www.usatoday.com/tech/news/techpolicy/2005-06-22-file-sharing x.htm, Jun. 19, 2008, 3 pages.

* cited by examiner

*Primary Examiner* — Steven Sax
*Assistant Examiner* — Anil N Kumar
(74) *Attorney, Agent, or Firm* — Harrity & Harrity, LLP

(57) ABSTRACT

A system may provide a toolbar in a browser at a client, where the toolbar permits user selection from multiple different services for sharing document content. The system may receive a selection of a first one of the multiple different services from a user via the toolbar and may receive a selection of content of a first document browsed by the user. The system may post the selected content in a second document associated with the first one of the multiple different services.

17 Claims, 15 Drawing Sheets

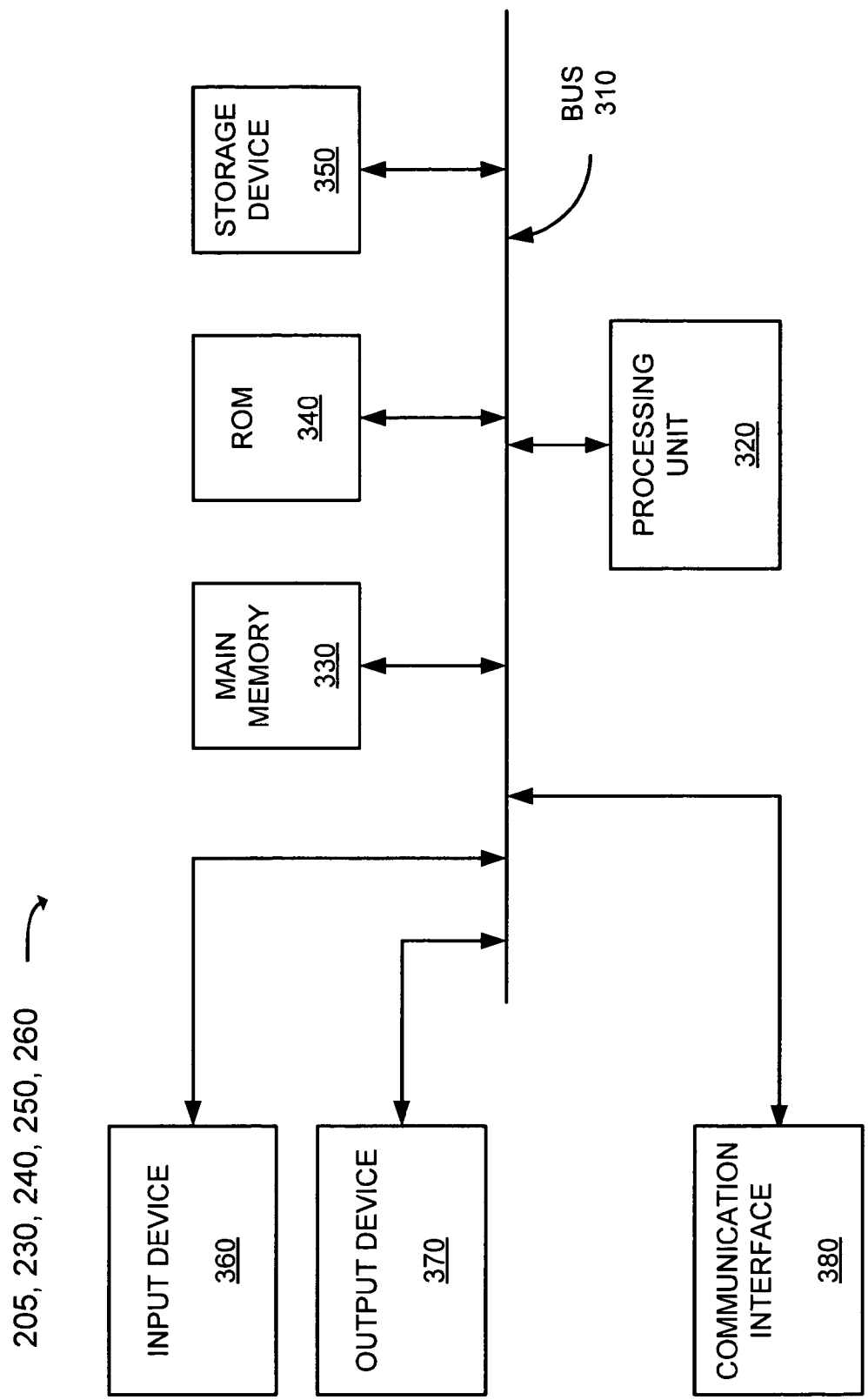

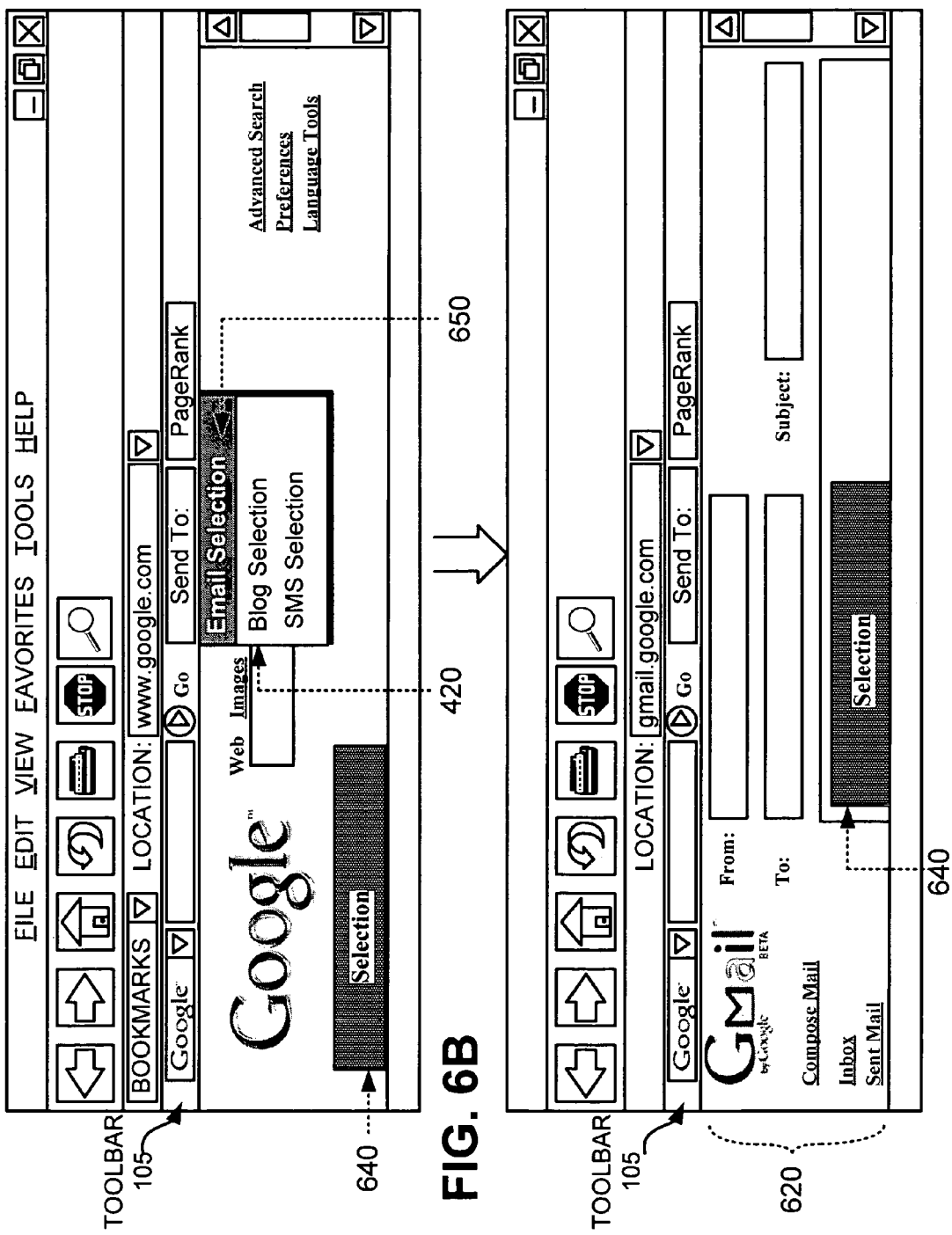

TOOLBAR DOCUMENT CONTENT SHARING

BACKGROUND

1. Field of the Invention

Implementations described herein relate generally to document browsing and, more particularly, to sharing document content via a browser toolbar.

2. Description of Related Art

The advent of the global Internet and the World Wide Web ("web") has given users throughout the world the capability to quickly and easily access and retrieve information stored at remote locations. Through the web, users may access, via laptop or desktop computers at their home or business (or via other types of devices such as PDAs, public Internet terminals, etc.), documents stored anywhere in the world. When accessing documents via the web, users may desire to share content contained in the accessed documents with other users. To share the content, a user may, for example, copy a portion of a document being browsed, manually open an e-mail client, manually open a new e-mail message, and then manually paste the portion of the document within the e-mail message. Sharing document content in such a manner, however, may be undesirably cumbersome and time consuming.

SUMMARY

According to one aspect, a method may include providing a menu listing multiple different services to a user for sharing content with other users and receiving a selection of one of the multiple different services from the menu. The method may further include providing user selected content to the one of the multiple different services.

According to another aspect, a method may include providing a toolbar in a browser at a client, where the toolbar permits user selection from a group of different services for sharing document content. The method may further include receiving a selection of a first one of the group of different services from a user via the toolbar and receiving a selection of content of a first document browsed by the user. The method may also include posting the selected content in a second document associated with the first one of the group of different services.

According to a further aspect, a graphical user interface implemented at a computer may include a first graphical area on a toolbar of the graphical user interface and a second graphical area activated by selection of the first graphical area. The second graphical area may list multiple services that can be selected by a user for sharing document content and the multiple services may include an e-mail service, a blog service and a short message service (SMS).

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 3 is an exemplary diagram of a client or server of FIG. 2 according to an implementation consistent with principles of the invention;

FIGS. 6A and 6B are diagrams of the selection of an e-mail service from multiple services provided on a browser toolbar for sharing document content with other users;

DETAILED DESCRIPTION

The following detailed description of the invention refers to the accompanying drawings. The same reference numbers in different drawings may identify the same or similar elements. Also, the following detailed description does not limit the invention.

Consistent with aspects of the invention, a browser toolbar may be enhanced with document content sharing functionality that permits a user to automatically share user selected document content with one or more other users using multiple messaging services. The toolbar may include a menu that permits a user to select from the multiple messaging services that can be used to share document content with the other users. The multiple messaging services may include, for example, an email service (e.g., Google Gmail), a blog service (e.g., Google Blogger) or a short message service (e.g., Google SMS). After selection of one of the multiple messaging services from the toolbar menu, the toolbar may automatically cause the selected content to be posted in a document associated with the one of the multiple messaging services. The selected message service may subsequently forward the selected content to its intended destination to share the content with other users.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Overview

Figure 1:
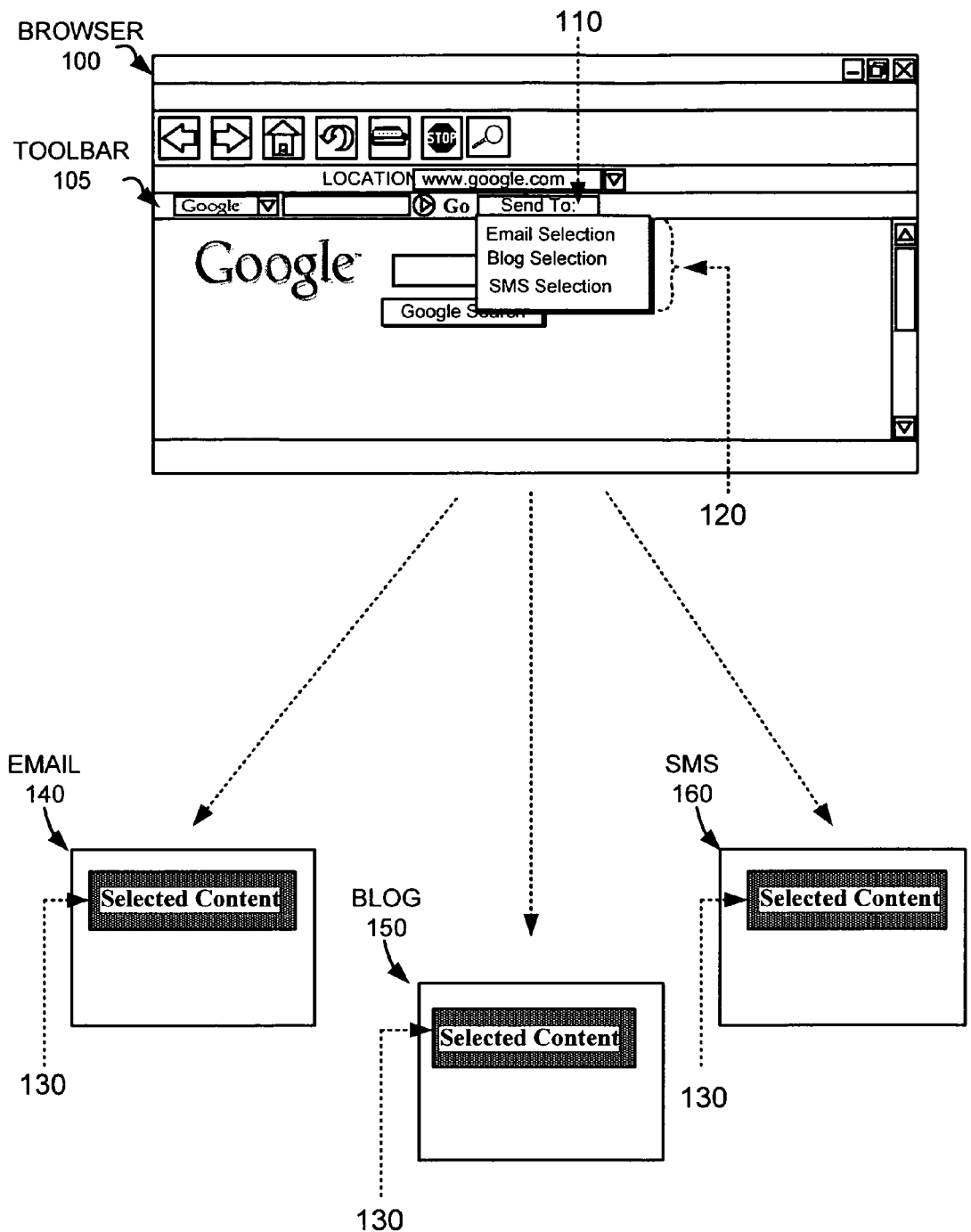
FIG. 1 is an exemplary diagram of an overview of an implementation of the invention.

FIG. 1 illustrates an exemplary overview of a browser toolbar that permits a user browsing documents to copy all, or portions, of the content of the documents and selectively provide the content to other users via a messaging service, such as, for example, an e-mail service, a blog service, or a short message service (SMS). As shown in FIG. 1, a user browsing documents via a browser 100 may select a button 110 from a toolbar 105 displayed on browser 100. Selection of button 110 may result in the display of a menu 120 that includes multiple different content delivery service options. For example, menu 120 may include an "Email selection" option, a "Blog selection" option, and/or a "SMS selection" option. While e-mail, blog, and SMS delivery service options are discussed below, it will be appreciated that other content delivery options may alternatively be provided. For example, an "Instant Messaging selection" option may also, or alternatively, be presented to the user.

User selection of one of the options from menu 120 results in toolbar 105 opening another browser (not shown) and directing the newly opened browser to one of an e-mail document 140, a blog document 150, or an SMS message document 160 hosted by a corresponding e-mail, blog, or SMS service. Toolbar 105 may automatically post user selected content 130 (e.g., selected content of a document, or an entire document) in one of e-mail document 140, blog document 150, or SMS message document. In other implementations, the email document 140, blog document 150 of SMS message document 160 may be opened in a browser sidebar (not shown), instead of a new browser.

Subsequent to posting of the user selected content, the corresponding e-mail, blog or SMS services may transmit messages containing the user selected content to their appropriate destinations. For example, if a user uses toolbar 105 to post content in an e-mail, the corresponding e-mail service may forward the e-mail to the destination e-mail address(es) specified by the user. As another example, if the user uses toolbar 105 to post content in a blog, the corresponding blogging service may post the content on a web document that may be accessed by other users (i.e., bloggers). As a further example, if the user uses toolbar 105 to post content in a SMS message, the corresponding SMS service may forward the message to the appropriate wireless device (e.g., cellular telephone) specified by the user.

Exemplary Network configuration

Figure 2:
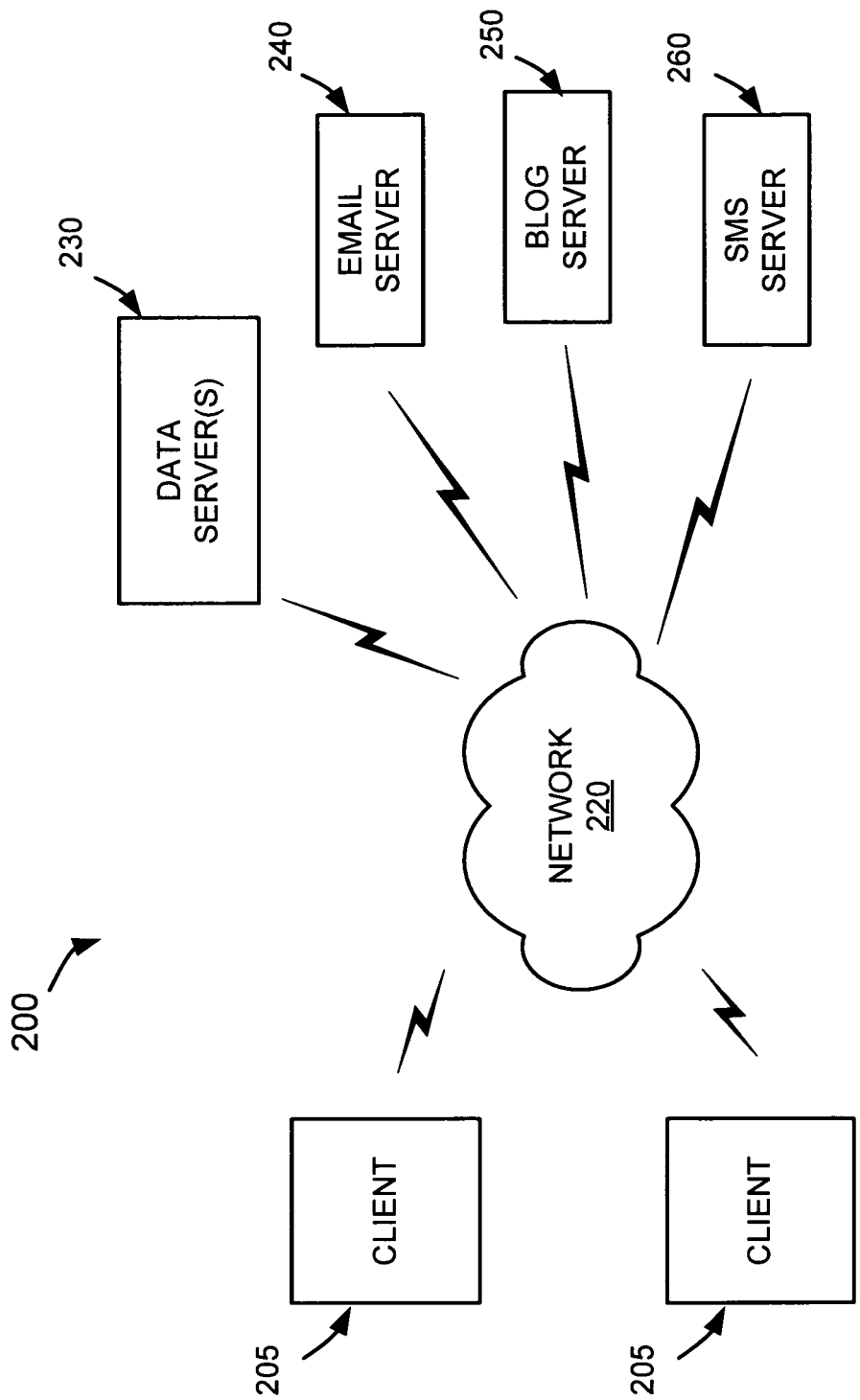
FIG. 2 is an exemplary diagram of a network in which systems and methods consistent with principles of the invention may be implemented.

FIG. 2 is an exemplary diagram of a network 200 in which systems and methods consistent with the principles of the invention may be implemented. Network 200 may include multiple clients 205 connected to server 230, email server 240, blog server 250 and short message service (SMS) server 260 via a network 220. Two clients 205 and servers 230, 240, 250 and 260 have been illustrated as connected to network 220 for simplicity. In practice, there may be more or fewer clients and servers. Also, in some instances, a client may perform one or more functions of a server and a server may perform one or more functions of a client.

Clients 205 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Clients 205 may implement a browser for browsing documents stored at server 230, the browser including a toolbar 105 that includes document content sharing functionality, as further described in detail below. Clients 205 and servers 230, 240, 250 and 260 may connect to network 220 via wired, wireless, and/or optical connections.

Data server(s) 230 may store or maintain documents that may be browsed by clients 205. Such documents may include data related to published news stories, products, images, user groups, geographic areas, or any other type of data. For example, server(s) 230 may store or maintain news stories from any type of news source, such as, for example, the Washington Post, the New York Times, Time magazine, or Newsweek. As another example, server(s) 230 may store or maintain data related to specific products, such as product data provided by one or more product manufacturers. As yet another example, server(s) 230 may store or maintain data related to other types of web documents, such as pages of web sites.

Email server 240 may provide an electronic mail service (e.g., Google Gmail) that permits users at clients 205 to send email to other users via email server 240. Blog Server 250 may host content posted by users from clients 205. Short message service (SMS) server 260 may transfer messages (e.g., text messages) from users at clients 205 to mobile devices, such as, for example, cellular telephones via SMS.

While servers 230, 240, 250 and 260 are shown as separate entities, it may be possible for one of servers 230-260 to perform one or more of the functions of the other one of servers 230-260. For example, it may be possible that multiple ones of servers 230-260 are implemented as a single server. It may also be possible for a single one of servers 230-260 to be implemented as two or more separate (and possibly distributed) devices.

Network 220 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

Exemplary Client/Server Architecture

FIG. 3 is an exemplary diagram of a client or server entity (hereinafter called "client/server entity"), which may correspond to one or more of clients 205 and/or servers 230-260, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 220.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Client Toolbar

Figure 4A:
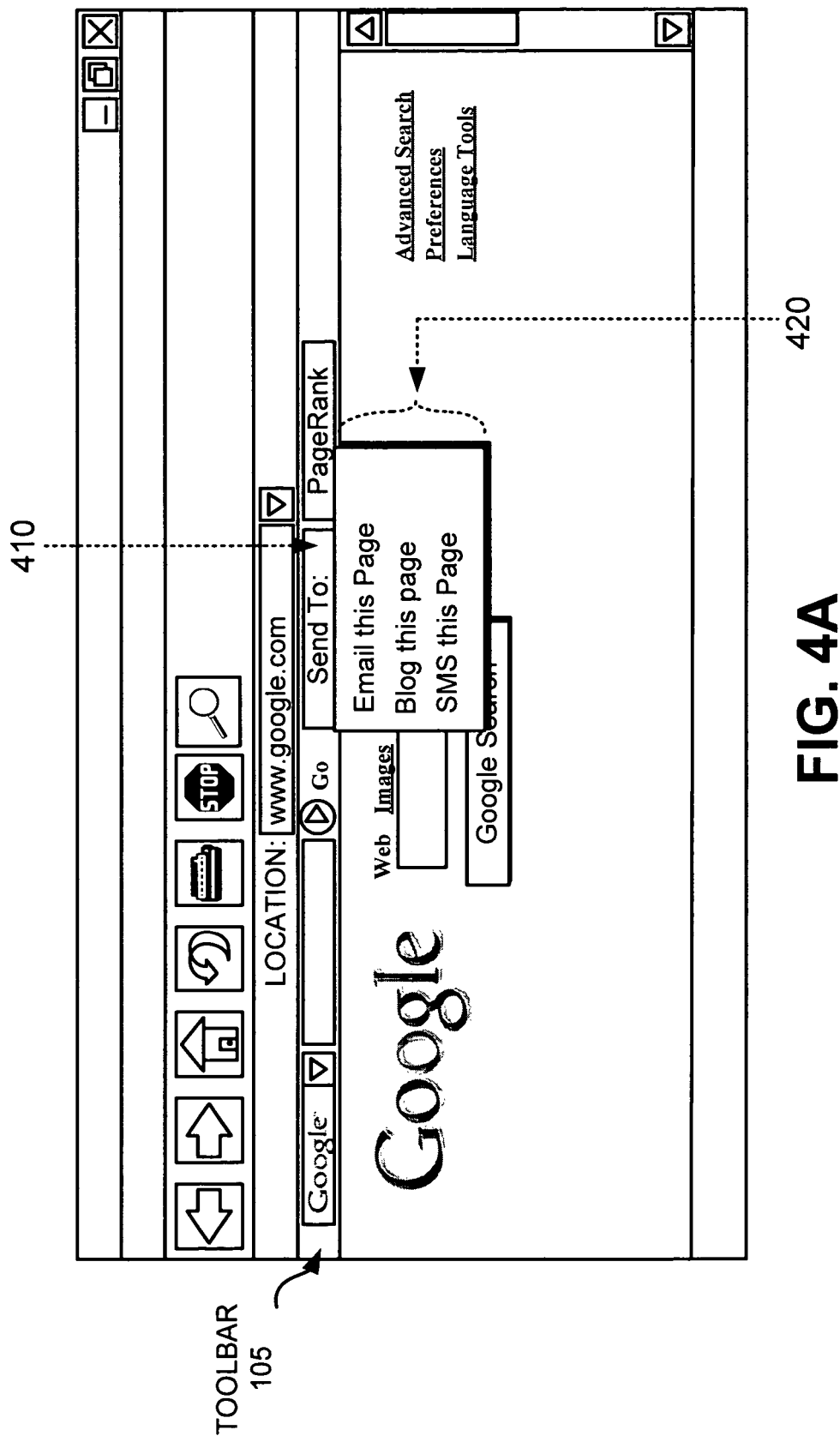
FIGS. 4A and 4B are diagrams of an exemplary button and menu of a browser toolbar consistent with principles of the invention.
Figure 4B:
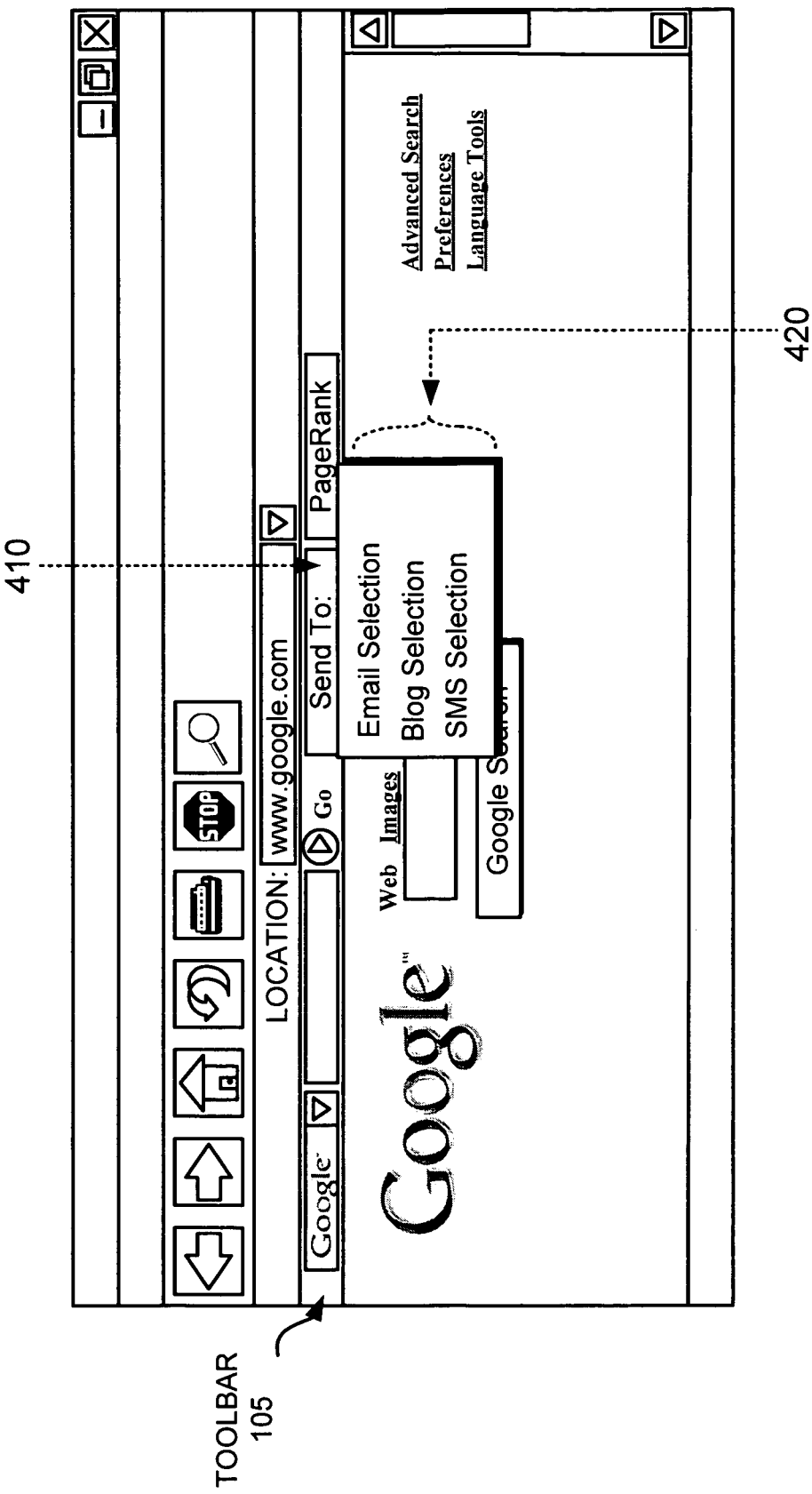

FIGS. 4A and 4B are diagrams that depict an exemplary browser toolbar 105 at a client 205. Among other features, toolbar 105 may include a "Send To:" button 410, the selection of which by a user at client 205 may produce a window 420 (e.g., a drop-down window). Window 420 may include a menu of multiple different services (e.g., in list form) that may be used for sharing document content with other users. In the exemplary implementation of FIG. 4A, window 420 may include the options of emailing, blogging, or short message servicing a current document (e.g., web page) being browsed. For example, if no content is currently selected in the browser (e.g., the user has not highlighted any portions of the currently displayed document), and the user selects button 410, then the user may choose from "Email this page," "Blog this Page," or "SMS this Page" from window 420. After selection of one of these services from window 420, the entire document (e.g., web page) currently being displayed in the browser may be posted into the selected email, blog or SMS service.

In the exemplary implementation of FIG. 4B, window 420 may include the options of emailing, blogging, or short message service servicing selected portions of a current document (e.g., web page) being browsed (e.g., the user has highlighted one or more portions of the currently displayed document). For example, if a user selects one or more sections of a document and then selects button 410, then the user may choose from "Email Selection," Blog Selection," or "SMS Selection" from window 420. After selection of one of these services from window 420, the selected sections of the document may be posted into the selected email, blog or SMS service.

Exemplary Toolbar Document
Content Sharing Process

Figure 5A:
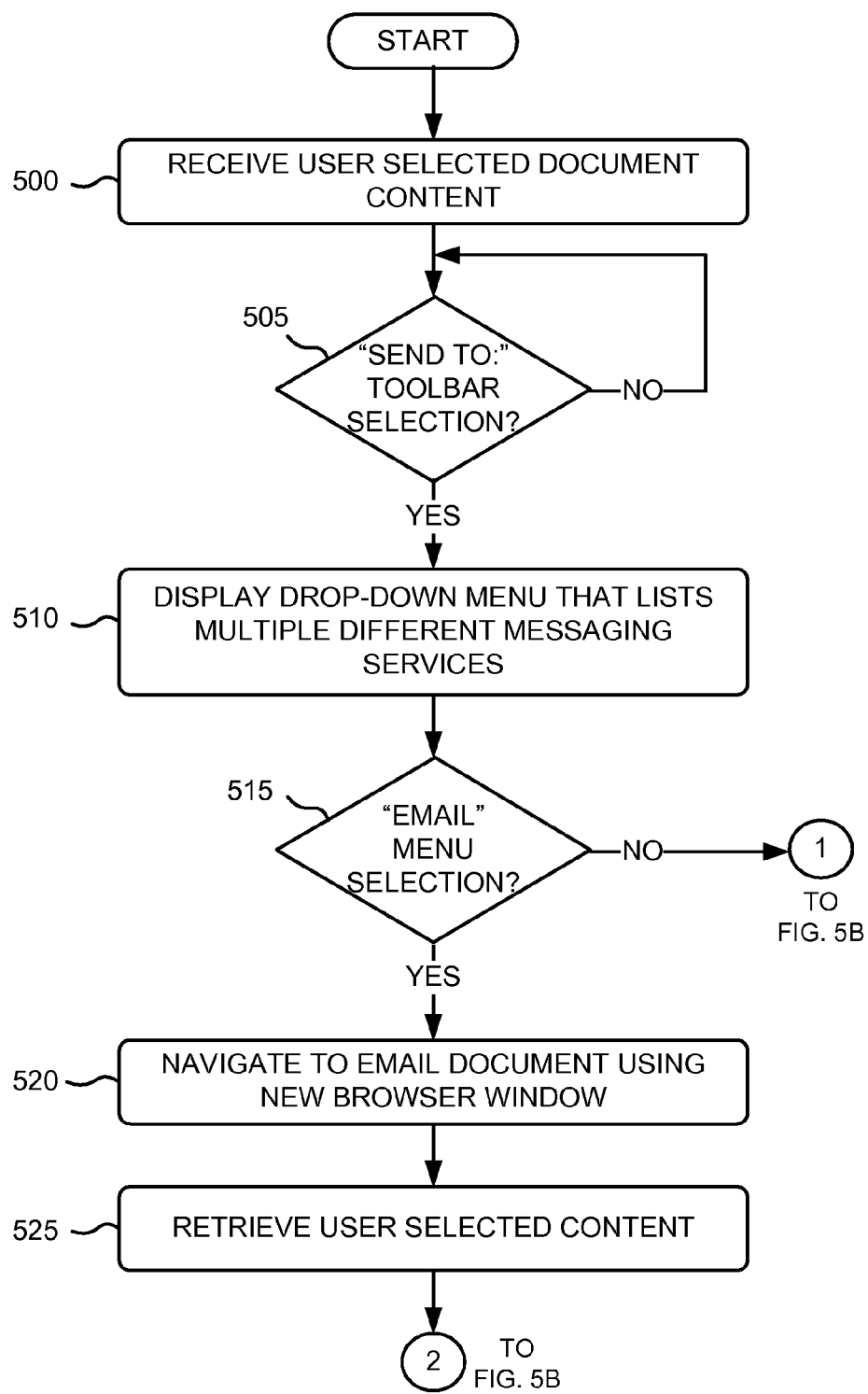
FIGS. 5A through 5C are a flowchart of an exemplary process for sharing document content via one of multiple services consistent with principles of the invention.
Figure 5B:
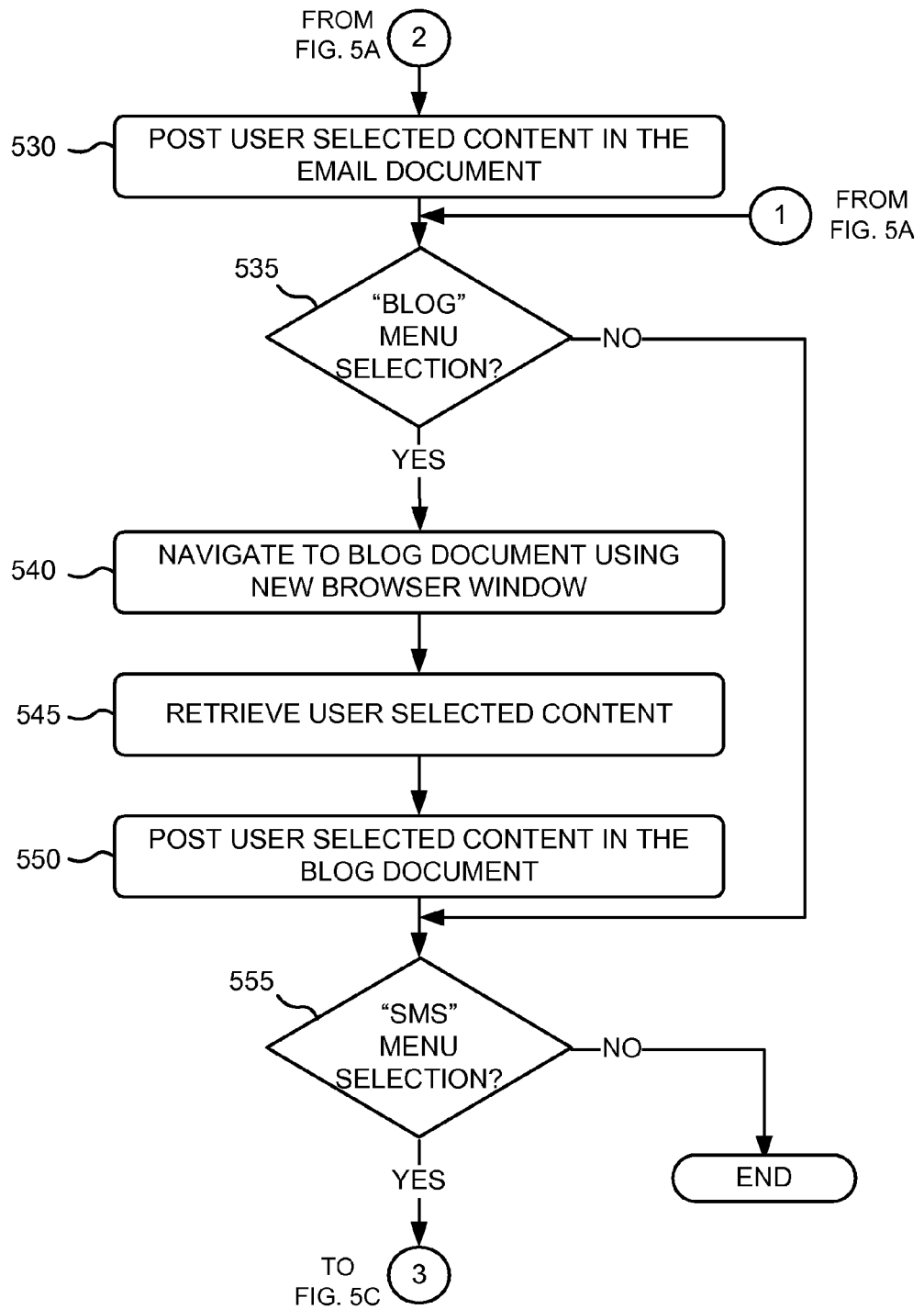
Figure 5C:
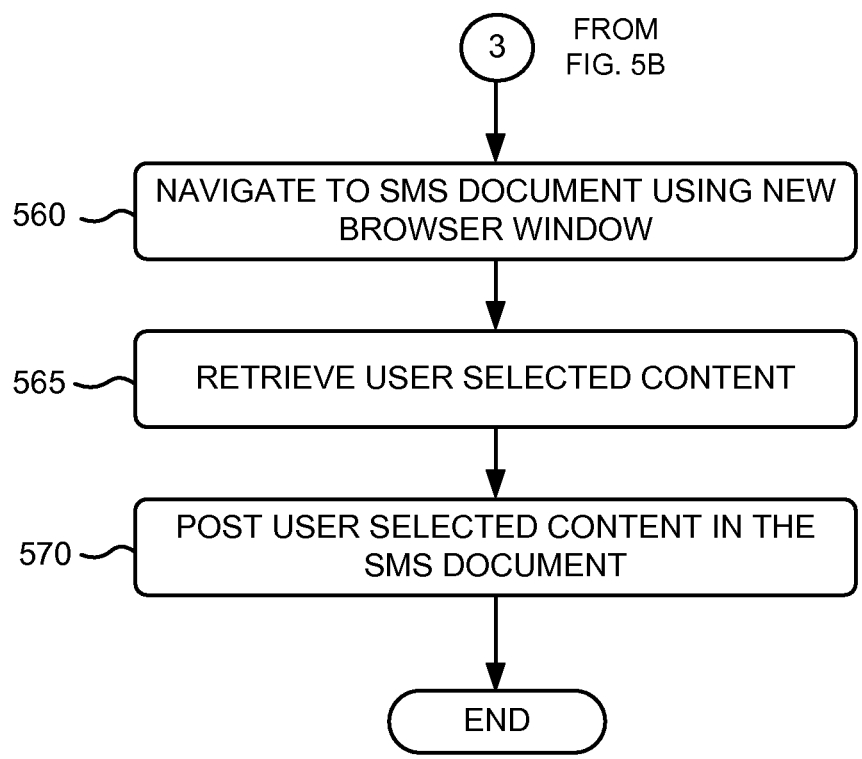

FIGS. 5A-5C are a flowchart of an exemplary process for sharing document content via one of multiple services consistent with principles of the invention. The process exemplified by FIGS. 5A-5C may be performed by toolbar 105 at a client 205.

Figure 6A:
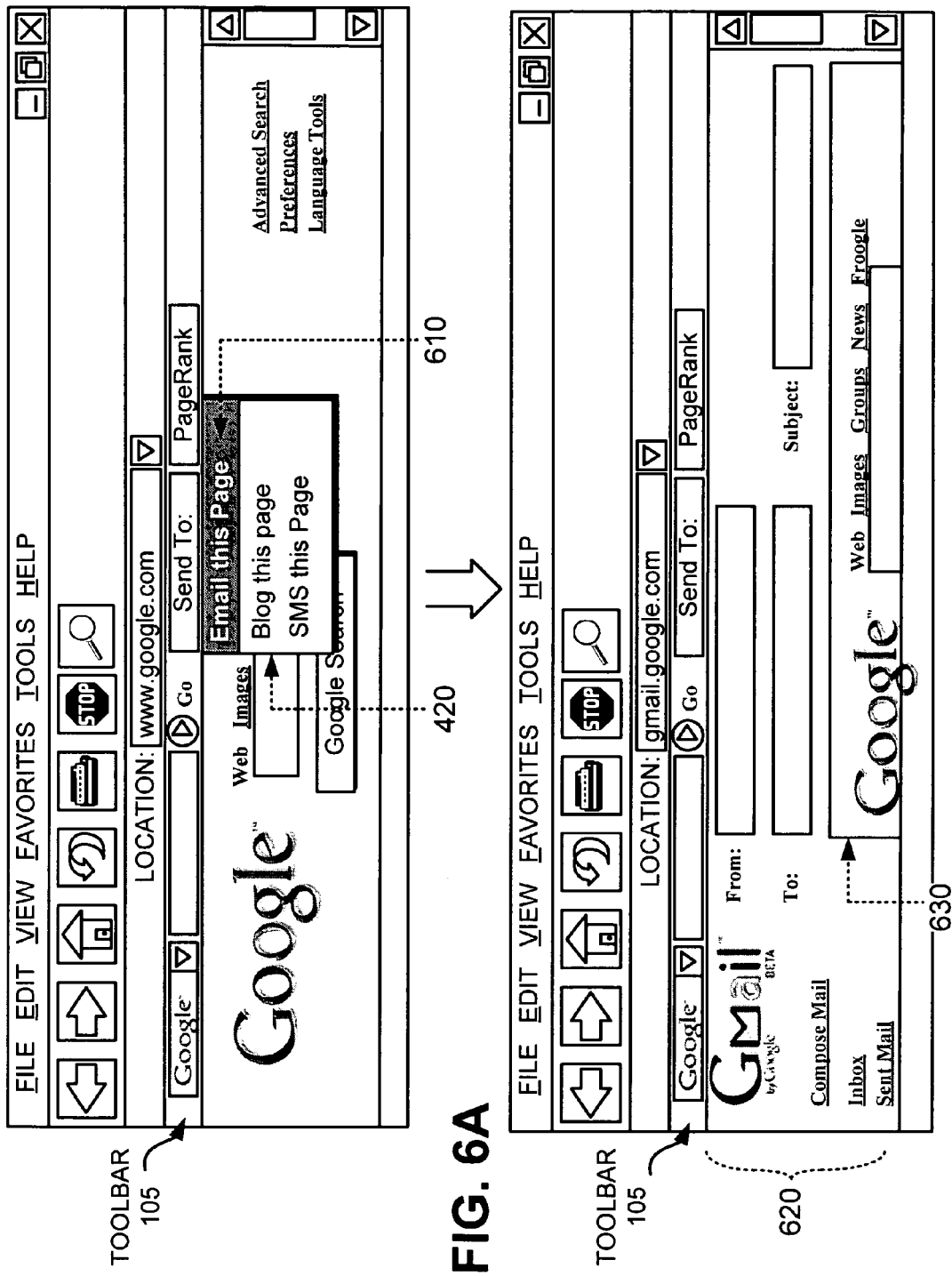

The exemplary process may begin with the receipt of a selected portion of a document's content (block 500). The user may select document content by browsing a specific document such that the document's content is displayed by a browser (i.e., effectively "selecting" the entirety of the document), or by selecting one or more portions of the document content displayed by the browser (e.g., by highlighting specific portions of the document using a mouse). A determination may be made whether "Send To:" button 410 has been selected by a user from toolbar 105 (block 505). A user may select button 410 on toolbar 105, for example, by "clicking" on the button using a mouse. If button 410 has been selected, then a drop-down menu 420 may be displayed in the browser that lists multiple different messaging services (block 510). For example, as shown in FIGS. 6A and 6B, window 420, containing a drop-down menu, may be displayed in toolbar 105.

A determination may be made whether the "email" messaging service has been selected from menu 420 (block 515). For example, as shown in FIGS. 6A and 6B, "Email this Page" 610 or "Email Selection" 650 may be selected from window 420. If "email" messaging has not been selected, the exemplary process may continue after block 530 below. If the "email" messaging service has been selected from menu 420, then toolbar may navigate to an email document using a new browser window (block 520). For example, as shown in FIGS. 6A and 6B, toolbar 105 may navigate to an email document 620 in a new browser window. Prior to navigating to email document 620, the user may, in some implementations consistent with the principles of the invention, first be required to log-in to the e-mail service. In such an instance, another intermediate browser window may be opened, and the user selected content may be temporarily posted in this browser until the user logs into the email service (e.g., provides a login identifier and password). After the user logs in, the user selected content may be retrieved from the browser and posted in the email document provided by email server 240.

Toolbar 105 may retrieve the user selected content (i.e., from block 500 above) and post the user selected content in the email document (blocks 525 and 530). For example, as illustrated in FIG. 6A, toolbar 105 may post an entire document 630 being browsed by the user in email document 620. As further shown in FIG. 6B, toolbar 105 may post a selection (e.g., a selected portion) 640 of a document into email document 620. The user may enter the remaining fields (e.g., "From:", "To:", "Subject:", etc.) of email document 620 prior to having email server 240 (e.g., Google Gmail) that hosts email document 620 forward the email to its intended destination.

Figure 7A:
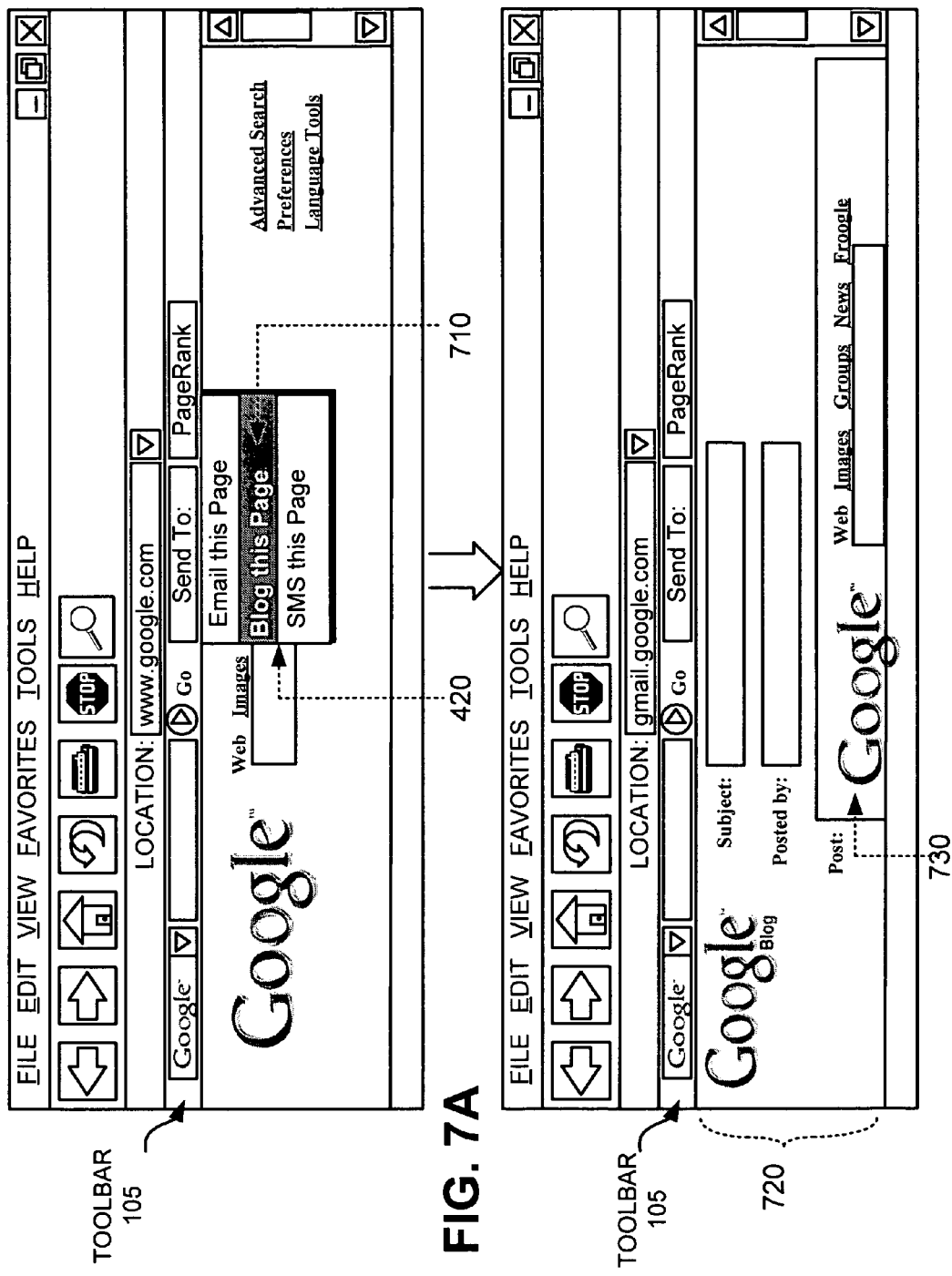
FIGS. 7A and 7B are diagrams of the selection of a blog service from multiple services provided on a browser toolbar for sharing document content with other users.
Figure 7B:
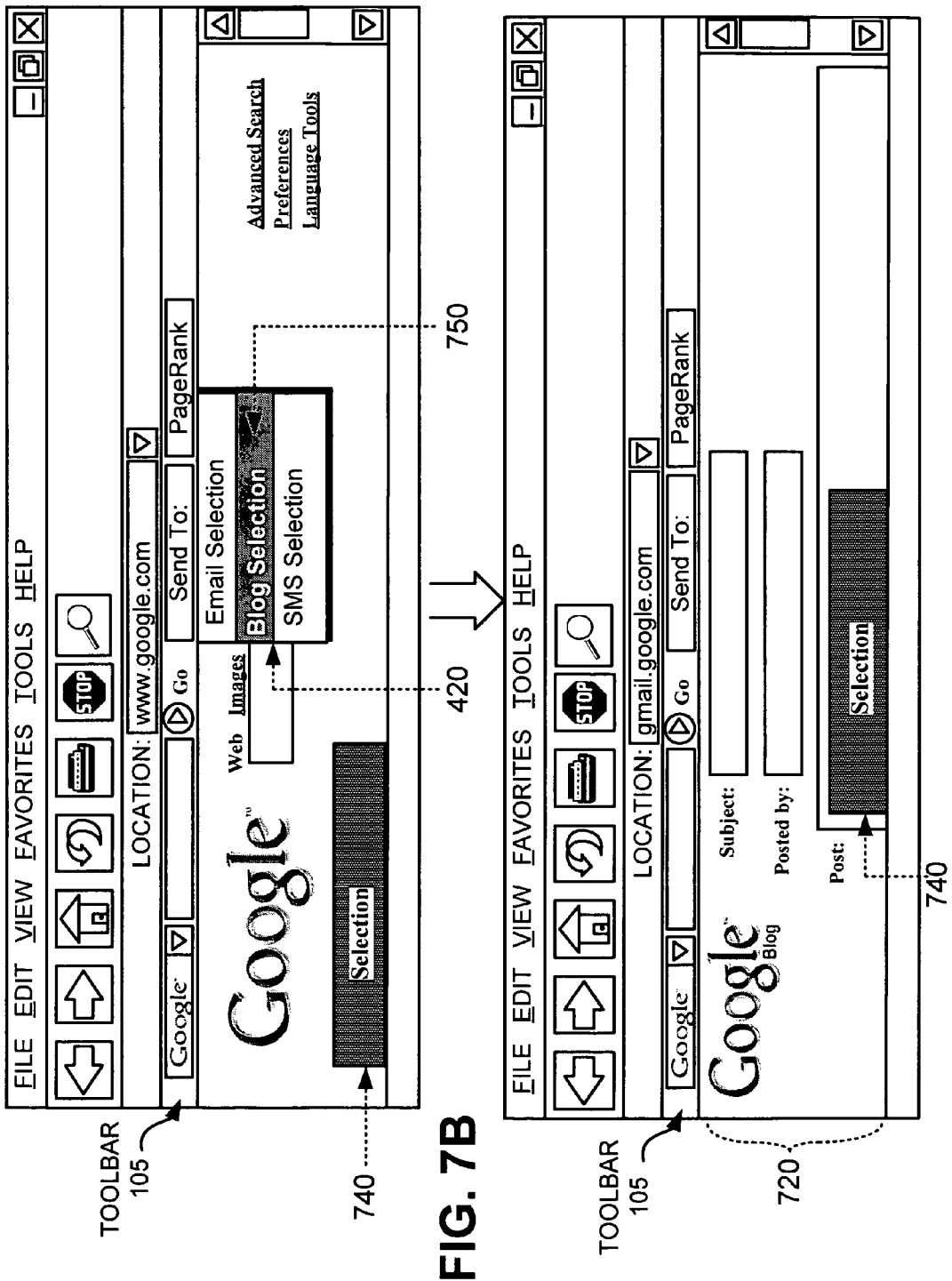

A determination may be made whether the "blog" messaging service has been selected from menu 420 (block 535, FIG. 5B). For example, as shown in FIGS. 7A and 7B, "Blog this Page" 710 or "Blog Selection" 750 may be selected from window 420. If "blog" messaging has not been selected, the exemplary process may continue at block 555 below. If the "blog" messaging service has been selected from menu 420, then toolbar 105 may navigate to a blog document using a new browser window (block 540). For example, as shown in FIGS. 7A and 7B, toolbar 105 may navigate to a blog document 720 in a new browser window. Prior to navigating to blog document 720, the user may, in some implementations consistent with the principles of the invention, first be required to log-in to the blog service. In such an instance, another intermediate browser window may be opened, and the user selected content may be temporarily posted in this browser until the user logs into the blog service (e.g., provides log-in identifier and password). After the user logs in, the user selected content may be retrieved from the browser and posted in the blog document provided by blog server 250.

Toolbar 105 may retrieve the user selected content (i.e., selected in block 500 above) (block 545) and may post the user selected content in the blog document (block 550). For example, as illustrated in FIG. 7A, toolbar 105 may post an entire document 730 being browsed by the user in blog document 720. As further shown in FIG. 7B, toolbar 105 may post a selection (e.g., a selected portion) 740 of a document into blog document 720. The user may enter the remaining fields (e.g., "Subject:", "Posted by:", etc.) of blog document 720 prior to having blog server 250 (e.g., Google Blog) that hosts blog document 720 post the blog for access by other users.

Figure 8A:
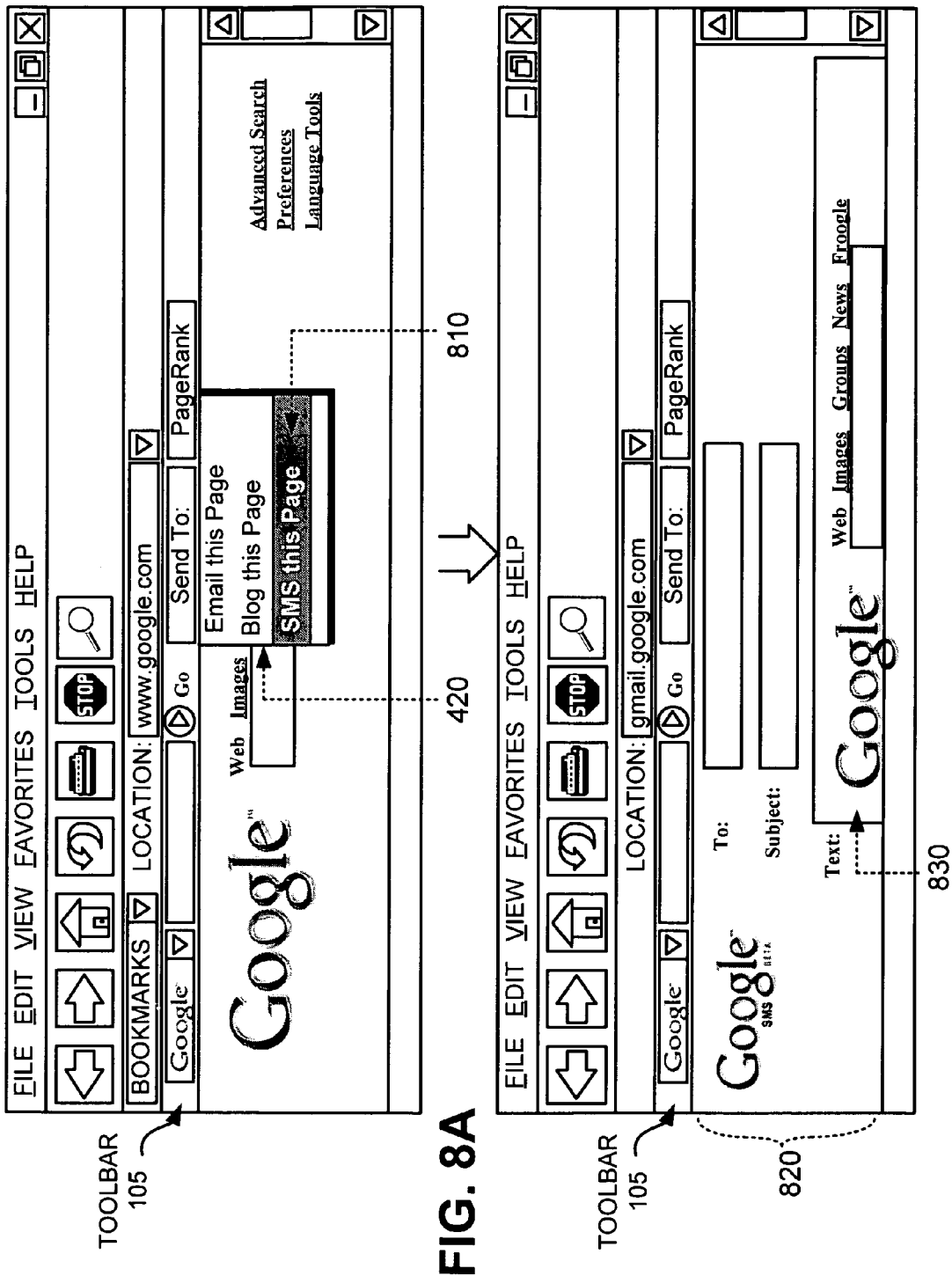
FIGS. 8A and 8B are diagrams of the selection of a short message service (SMS) from multiple services provided on a browser toolbar for sharing document with other users.
Figure 8B:
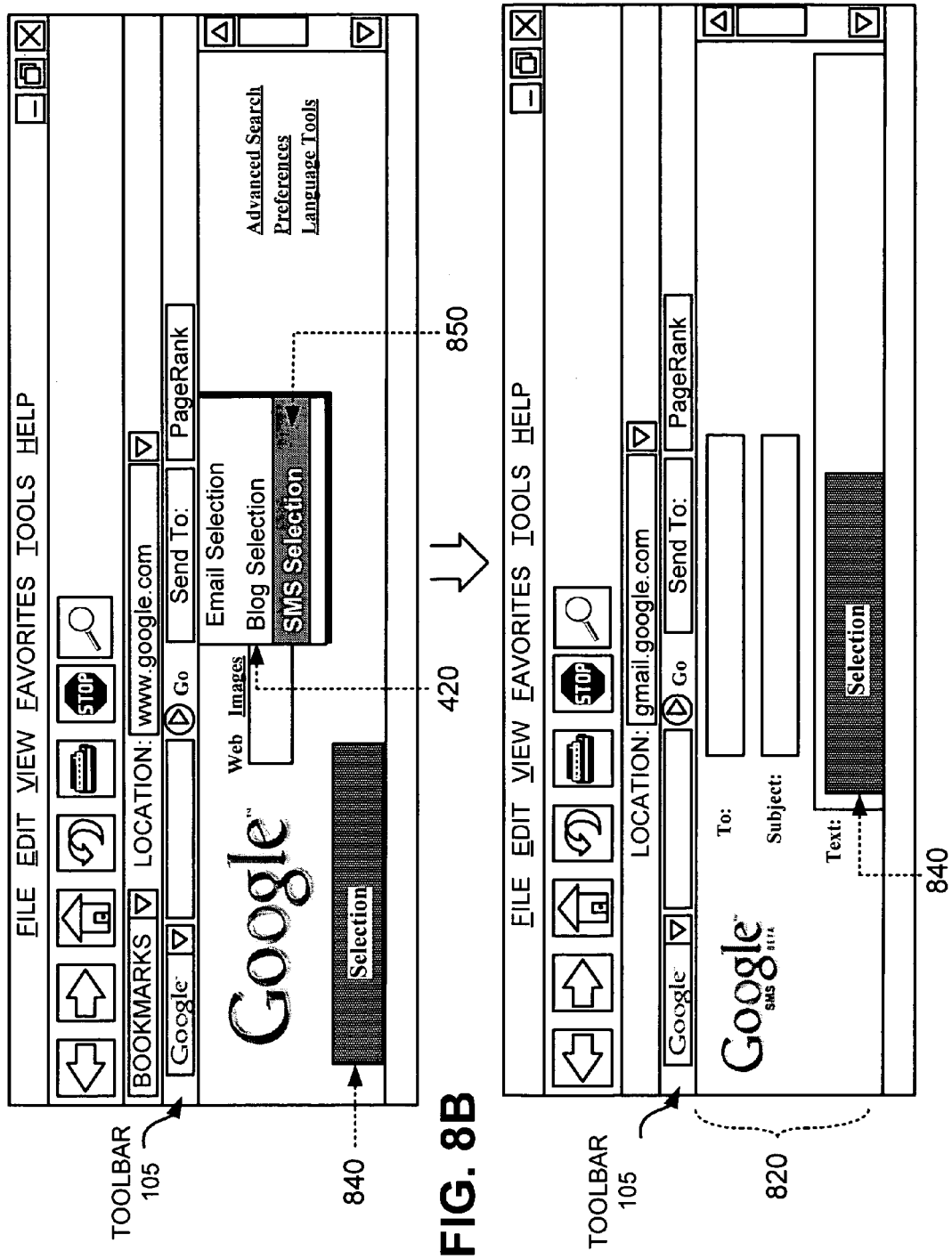

A determination may be made whether the "SMS" messaging service has been selected from menu 420 (block 555). For example, as shown in FIGS. 8A and 8B, "SMS this Page" 810 or "SMS Selection" 850 may be selected from window 420. If "SMS" messaging has been selected, toolbar 105 may navigate to a SMS document using a new browser window (block 560, FIG. 5C). For example, as shown in FIGS. 8A and 8B, toolbar 105 may navigate to a SMS document 820 in a new browser window. Prior to navigating to SMS document 820, the user may, in some implementations consistent with the principles of the invention, first be required to log-in to the SMS service. In such an instance, another intermediate browser window may be opened, and the user selected content may be temporarily posted in this browser until the user logs into the SMS service (e.g, provides a log-in identifier and password). After the user logs in, the user selected content may be retrieved from the browser and posted in the SMS document provided by SMS server 260.

Toolbar 105 may retrieve the user selected content (i.e., selected in block 500 above) and may post the user selected content in the SMS document (blocks 565 and 570). For example, as illustrated in FIG. 8A, toolbar 105 may post an entire document 830 being browsed by the user in SMS document 820. As further shown in FIG. 8B, toolbar 105 may post a selection (e.g., a selected portion) 840 of a document into SMS document 820. The user may enter the remaining fields (e.g., "To:", "Subject:", etc.) of SMS document 820 prior to having SMS server 260 (e.g., Google SMS) that hosts SMS document 820 forward the message to its intended destination (e.g., to an intended cellular telephone).

The user selected content posted in the email document (e.g., block 530), the blog document (e.g., block 550) and/or the SMS document (e.g., block 570) may subsequently be forwarded by a respective service to its intended destination. For example, an email service that corresponds to the email document (e.g., Google Gmail) may forward an email containing the user selected content to a user specified destination email address. As another example, a blog service that corresponds to the blog document may post the user selected content, and any associated text added by the user, in a blog post that may be accessed by multiple other users. As a further example, a SMS service that corresponds to the SMS document may forward a SMS message that includes the user selected content to a user-specified destination (e.g., a destination cellular telephone).

Figure 9:
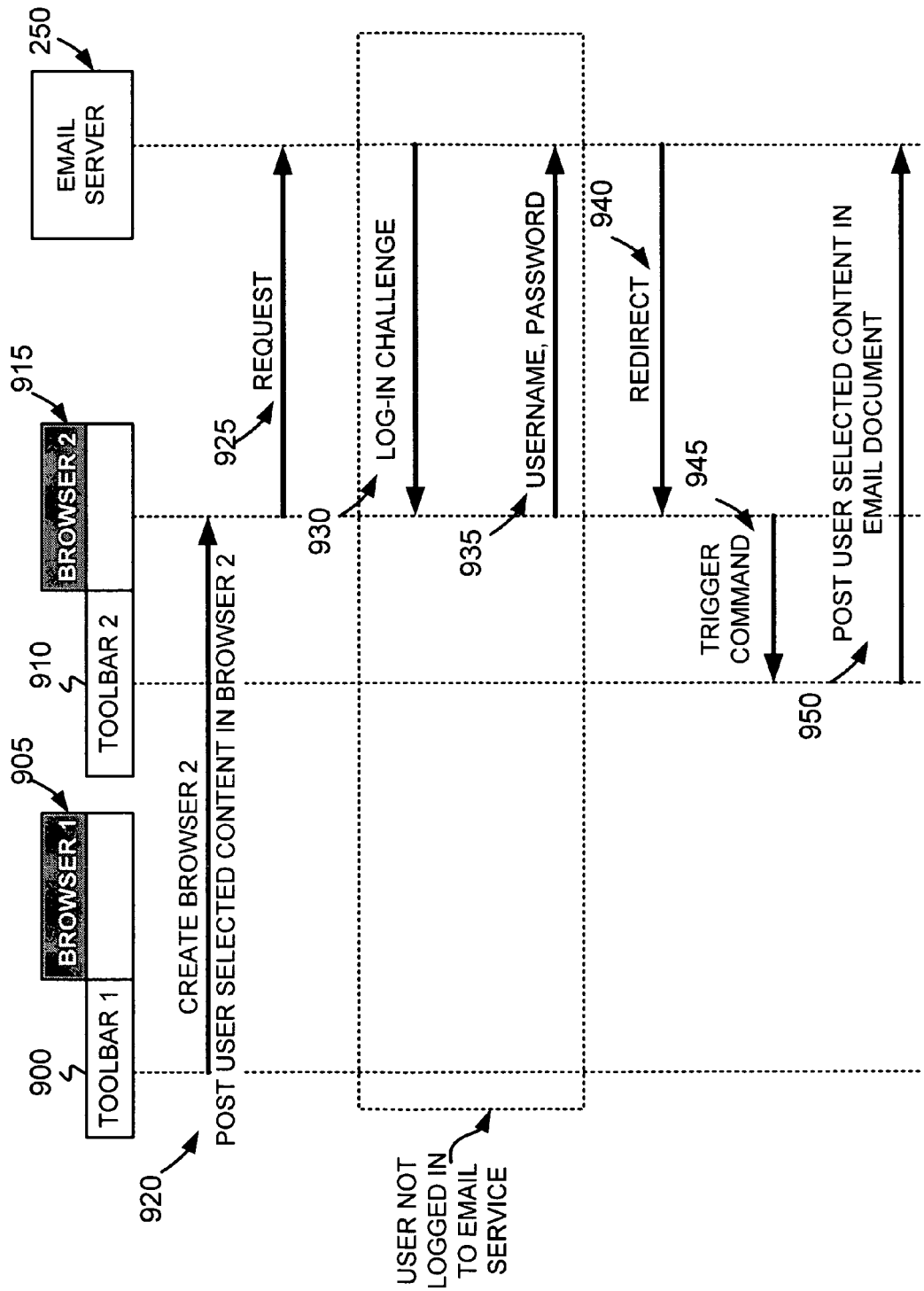
FIG. 9 is a diagram that illustrates toolbar, browser and server interaction consistent with one exemplary implementation of the invention.

FIG. 9 graphically illustrates toolbar, browser and email server interaction, consistent with one exemplary implementation, for automatic posting of user selected content in an email document for sharing with one or more other users. As shown in FIG. 9, a user may select content via browser 1 905, and then may select an email service for sharing content via toolbar 1 900. In response to the user selection, toolbar 1 900 may create (see 920) a second browser (browser 2 915), having its own toolbar (toolbar 2 910), and may post the user selected content in browser 2 915. After posting of the user selected content, browser 2 915 may send a request (see 925) to email server 240 requesting that server 240 provide an email document into which the user selected content can further be posted. If the user has not yet logged into email server 240, email server 240 may send (see 930) a log-in challenge to browser 2 915. The user, via browser 2 915, may provide (see 935) a log-in username and password to email server 240. In response to the user log-in, email server 240 may send (see 940) a redirect message to browser 2 915 causing browser 2 915 to navigate to an email document hosted by email server 240. In response to the redirect message, browser 2 915 may send (see 945) a trigger command to toolbar 2 910. Toolbar 2 910, in response to receipt of the trigger command, may post the user selected content in the email document provided by email server 240. The user may subsequently enter email address information and send the email to share the user selected content.

The toolbar, browser and email server interaction described above with respect to FIG. 9 may similarly be applied to blog server 250, or SMS server 260.

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 5A-5C, the order of the acts may be modified in other implementations consistent with the principles of the invention. Further, non-dependent acts may be performed in parallel. While some aspects of the invention have been described as being implemented using a toolbar menu, in other implementations, a content delivery service may be selected using a context menu (e.g., a right-click menu). In further implementations, keyboard accelerators (e.g., shortcut keys) may be used to initiate the content sharing process.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer, comprising:
  a memory comprising instructions; and
  a processor to execute the instructions to:
    implement:
      a first graphical area on a toolbar of a first web browser window,
      a second graphical area, of the first web browser window, from which a first user selects web-based content of a web document,
        the web-based content being less than an entirety of the web document, a third graphical area activated by selection of the first graphical area,
    where the third graphical area lists information identifying an email service, information identifying a blog service, information identifying a short message service (SMS), and information identifying an instant messaging service that are selectable by the first user for sharing the selected web-based content of the web document with a second user, and
a fourth graphical area, in a second web browser window, in which the selected web-based content is to be included prior to the selected web-based content being shared with the second user via one of the email service, the blog service, the SMS, or the instant messaging service,
    the fourth graphical area being created based on one of the information identifying the email service, the information identifying the blog service, the information identifying the SMS, or the information identifying the instant messaging service being selected;
receive selection of the web-based content of the web document from the second graphical area of the first web browser window; and
receive a selection of the one of the information identifying the email service, the information identifying the blog service, the information identifying the SMS, or the information identifying the instant messaging service,
    where selection of the information identifying the email service from the third graphical area causes an email, in the fourth graphical area, to be automatically populated with the selected web-based content,
        the email being associated with the email service,
    where selection of the information identifying the blog service from the third graphical area causes a blog, in the fourth graphical area, to be automatically populated with the selected web-based content,
        the blog being associated with the blog service,
    where selection of the information identifying the SMS from the third graphical area causes a SMS message, in the fourth graphical area, to be automatically populated with the selected web-based content,
        the SMS message being associated with the SMS, and
    where selection of the information identifying the instant messaging service from the third graphical area causes an instant message, in the fourth graphical area, to be automatically populated with the selected web-based content,
        the instant message being associated with the instant messaging service.

2. The computer of claim 1, where the first graphical area comprises a button on the toolbar.

3. The computer of claim 2, where the third graphical area comprises a drop-down menu that is displayed in the first web browser window upon user selection of the first graphical area, and
    where the information identifying the email service, the information identifying the blog service, the information identifying the SMS, and the information identifying the instant messaging service are displayed in the drop-down menu.

4. A system comprising:
one or more devices to:
    provide a first web browser window via a display associated with the one or more devices;
    receive a selection of web-based content from within a web document,
        where the selected web-based content is less than an entirety of the web document,
        the web document being included in the first web browser window;
    provide a menu, on the display, to a user,
        the menu being included in the first web browser window,
        the menu listing information for sharing the selected web-based content with another user via a network,
            the information including information identifying an email service, information identifying a short message service (SMS), information identifying an instant message service, and information identifying a blog service;
    receive a selection of one of the information identifying the email service, the information identifying the SMS, the information identifying the instant message service, or the information identifying the blog service;
    automatically create a second web browser window based on receiving the selection of the one of the information identifying the email service, the information identifying the SMS, the information identifying the instant message service, or the information identifying the blog service,
        the second web browser window including one of:
            an email when the information identifying the email service is selected,
            a SMS message when the information identifying the SMS is selected,
            an instant message when the information identifying the instant message service is selected, or
            a blog when the information identifying the blog service is selected; and
    selectively automatically populate:
        the email with the selected web-based content when the information identifying the email service is selected,
        the SMS message with the selected web-based content when the information identifying the SMS service is selected,
        the instant message with the selected web-based content when the information identifying the instant message service is selected, or
        the blog with the selected web-based content when the information identifying the blog service is selected.

5. A computer-readable memory device that stores instructions, the instructions comprising:
one or more instructions which, when executed by one or more processors, cause the one or more processors to provide a toolbar in a client web browser,
    where the toolbar permits user selection from a list of information identifying multiple different services for sharing web document content over a network,
        the multiple different services including a blog service, an email service, a short message service (SMS), and an instant messaging service;
one or more instructions which, when executed by the one or more processors, cause the one or more processors to receive a selection of information identifying one of the multiple different services, from a user via the toolbar, as a selected one of the multiple different services;

one or more instructions which, when executed by the one or more processors, cause the one or more processors to receive a selection of web-based content of a first web document, in a first web browser window of the client web browser, browsed by the user,
where the selected web-based content comprises less than an entirety of the first web document;
one or more instructions which, when executed by the one or more processors, cause the one or more processors to automatically create, based on the selected one of the multiple different services, a second web browser window of the client web browser,
the second web browser window being associated with the selected one of the multiple different services; and
one or more instructions which, when executed by the one or more processors, cause the one or more processors to automatically populate, based on creating the second web browser window, a second web document, associated with the second web browser window, with the selected web-based content for sharing the selected web-based content over the network,
the one or more instructions to automatically populate the second web document include:
one or more instructions to automatically populate a blog document, associated with the blog service, with the selected web-based content when the selected one of the multiple different services is the blog service,
one or more instructions to automatically populate an email document, associated with the email service, with the selected web-based content when the selected one of the multiple different services is the email service,
one or more instructions to automatically populate a SMS document, associated with the SMS service, with the selected web-based content when the selected one of the multiple different services is the SMS service, and
one or more instructions to automatically populate an instant message, associated with the instant messaging service, with the selected web-based content when the one of the multiple different services is the instant messaging service.

6. The computer of claim 1, where the second graphical area comprises a browser.

7. A method comprising:
retrieving, by one or more processors, a web document using a web browser;
presenting, by the one or more processors, the web document in a first web browser window associated with the web browser;
providing, by the one or more processors and via the first web browser window, a menu listing of services that lists information identifying a plurality of services for sending content to an intended destination over a network,
the information identifying the plurality of services including:
information identifying a blog service,
information identifying an email service,
information identifying a short message service (SMS), and
information identifying an instant messaging (IM) service;
receiving, by the one or more processors and as a selected service, a selection of one of the information identifying the blog service, the information identifying the email service, the information identifying the SMS, or the information identifying the IM service from the menu listing of services;
automatically creating, by the one or more processors, a second web browser window, based on receiving the selection of the one of the information identifying the blog service, the information identifying the email service, the information identifying the SMS, or the information identifying the IM service,
the second web browser window including:
a blog service document associated with the blog service when the information identifying the blog service is selected,
an email service document associated with the email service when the information identifying the email service is selected,
a SMS document associated with the SMS when the information identifying the SMS is selected, or
an IM document associated with the IM service when the information identifying the IM service is selected;
receiving, by the one or more processors, selection of web-based content from the web document,
where the selected web-based content is less than an entirety of the web document;
automatically posting, by the one or more processors and based on automatically creating the second web browser window, the selected web-based content, from the web document, in:
the blog service document when the information identifying the blog service is selected,
the email service document when the information identifying the email service is selected,
the SMS document when the information identifying the SMS is selected, or
the IM document when the information identifying the IM service is selected; and
causing, by the one or more processors, the selected service to provide the selected web-based content to the intended destination over the network.

8. The method of claim 7, where providing the menu listing comprises:
providing a drop-down window that lists the information identifying the blog service, the information identifying the email service, the information identifying the SMS, and the information identifying the IM service.

9. The system of claim 4, where, when providing the menu, the one or more devices are to provide the menu in a toolbar of a browser.

10. The system of claim 4, where the web document is browsed by the user, and
where the web-based content includes one or more selected portions of the web document browsed by the user.

11. The computer-readable memory device of claim 5, where the web-based content includes one or more selected portions of the first web document browsed by the user.

12. The computer-readable memory device of claim 5, where the list of information identifying the multiple different services is provided via in a drop-down menu of the toolbar.

13. The system of claim 4, where the menu includes a drop-down menu.

14. The method of claim 7, where providing the menu listing of services comprises:
providing the menu listing of services in a toolbar of the web browser.

15. A method comprising:
implementing by one or more processors:
- a first graphical area on a toolbar of a first web browser window,
- a second graphical area of the first web browser window from which a first user selects web-based content of a web document,
  - the web-based content being less than an entirety of the web document,
- a third graphical area activated by selection of the first graphical area,
  - where the third graphical area lists information identifying an email service, information identifying a blog service, information identifying a short message service (SMS), and information identifying an instant messaging service that are selectable by the first user for sharing the selected web-based content of the web document with a second user; and
- a fourth graphical area, in a second web browser window, in which the selected web-based content is to be included prior to the selected web-based content being shared with the second user via one of the email service, the blog service, the SMS, or the instant messaging service,
  - the fourth graphical area being created based on one of the information identifying the email service, the information identifying the blog service, the information identifying the SMS, or the information identifying the instant messaging service being selected;

receiving, by the one or more processors, selection of the web-based content of the web document from the second graphical area of the first web browser window; and receiving, by the one or more processors, a selection of the one of the information identifying the email service, the information identifying the blog service, the information identifying the SMS, or the information identifying the instant messaging service,
  - where selection of the information identifying the email service from the third graphical area causes an email, in the fourth graphical area, to be automatically populated with the selected web-based content,
    - the email being associated with the email service,
  - where selection of the information identifying the blog service from the third graphical area causes a blog, in the fourth graphical area, to be automatically populated with the selected web-based content,
    - the blog being associated with the blog service,
  - where selection of the information identifying the SMS from the third graphical area causes a SMS message, in the fourth graphical area, to be automatically populated with the selected web-based content,
    - the SMS message being associated with the SMS, and
  - where selection of the information identifying the instant messaging service from the third graphical area causes an instant message, in the fourth graphical area, to be automatically populated with the selected web-based content,
    the instant message being associated with the instant messaging service.

16. The method of claim 15, where the first graphical area comprises a button on the toolbar.

17. The method of claim 15, where the third graphical area comprises a drop-down menu that is displayed in the first web browser window based on user selection of the first graphical area, and
where the information identifying the email service, the information identifying the blog service, the information identifying the SMS, and the information identifying the instant messaging service are displayed in the drop-down menu.

* * * * *